Aug. 7, 1951  R. C. BAIRD  2,563,509
VALVE CONTROLLED SILENCER
Filed Feb. 11, 1947  2 Sheets-Sheet 1

RAYMOND C. BAIRD
INVENTOR.

ATTORNEY

Aug. 7, 1951  R. C. BAIRD  2,563,509
VALVE CONTROLLED SILENCER
Filed Feb. 11, 1947  2 Sheets-Sheet 2
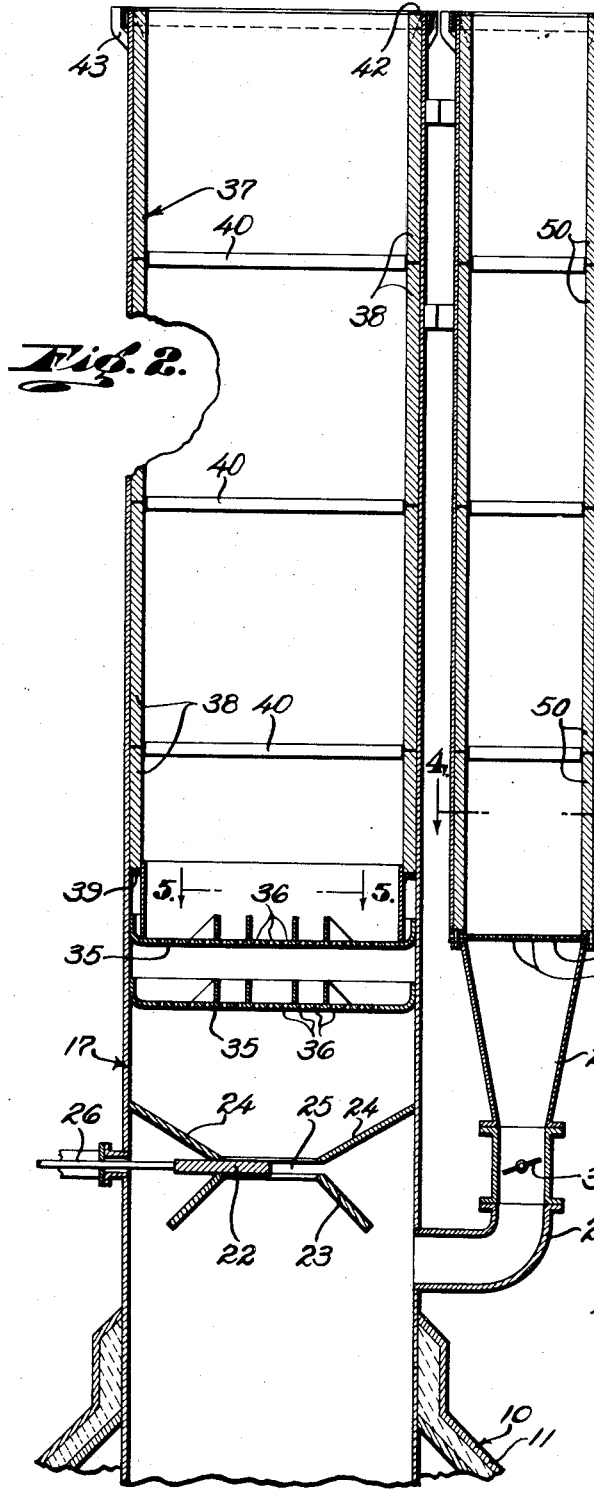
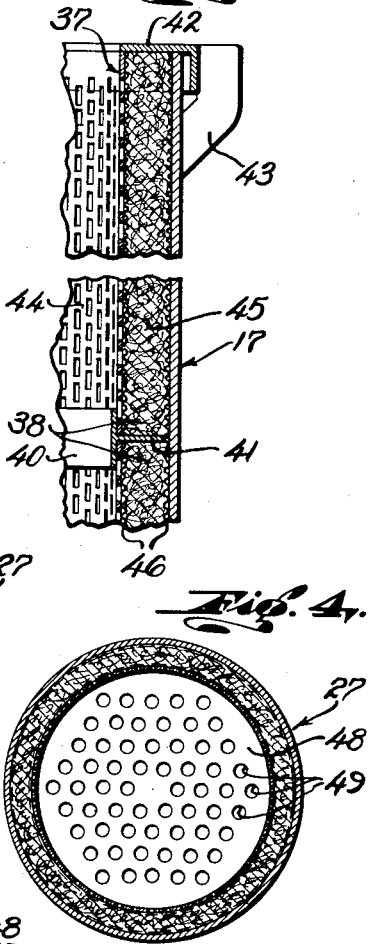
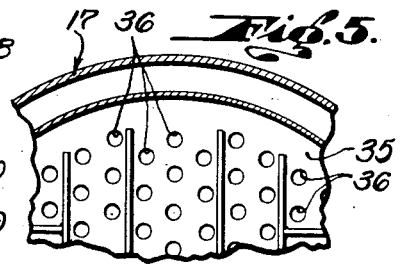
RAYMOND C. BAIRD
INVENTOR.
BY
ATTORNEY Patented Aug. 7, 1951

2,563,509

UNITED STATES PATENT OFFICE 2,563,509

VALVE CONTROLLED SILENCER

Raymond C. Baird, Los Angeles, Calif., assignor to The Fluor Corporation, Ltd., Los Angeles, Calif., a corporation of California Application February 11, 1947, Serial No. 727,921

1 Claim. (Cl. 181—35)

This invention relates generally to the suppression of noise created by the flow of high velocity gas streams, and is concerned particularly with the problem of suppressing the noise creating tendencies of gas streams flowing under conditions productive of low pitch sounds or long wave vibrations which are inadequately removed by sound absorbing materials.

Generally speaking, the capacity of the invention for suppression of noises which initially exist as low pitch sounds, is predicated upon conversion of the gas flow and low frequency vibrations to relatively high pitch sounds and corresponding high frequency vibrations which are removable by appropriate sound absorbing means or material. As will appear, the invention has particular applicability to situations where high velocity gas escape through a relatively large passage or orifice, such as a valve controlled opening, normally creates a turbulent flow condition manifested by intense low pitch sounds.

Conversion of gas energy to high pitch sounds is effected by passing the gas, at a location beyond such large orifice or valve controlled opening, through a plurality of relatively small passages or orifices, the effect of which is to accomplish a division of the stream and pressure drop converting the gas energy into high pitch or high frequency vibrations capable of being absorbed or dissipated. Most conveniently the described effect may be accomplished by one or a series of orifice plates, each containing a distribution of small openings affecting the gas stream uniformly across its course. The use of two or more orifice plates, instead of a single plate, with the same overall pressure drop results of course in correspondingly reduced pressure drop across each individual plate, and decreased gas velocities through it. Thus it is made possible, by reason of the antecedent pressure drop or drops to greatly reduce the velocity through the final orifice plate, with consequent reduction of the sound effect. In fact, the orifice plate series may themselves account for a substantial portion of the sound absorption.

Beyond the orifice plate or plates, means is provided for suppressing or absorbing the converted sound energy. Such means preferably employs a sound absorbing material, such as a tubular body of foraminate form or composition characterized by its capacity for absorption of sound waves of the frequency or wave length created at the orifice plate.

In certain of its more specific aspects the invention is directed to the suppression of sounds normally emanating from the catalyst regenerator in a hydrocarbon cracking or conversion plant. A serious noise condition arises from the operation of such plants by reason of the discharge from the catalyst converter of great quantities of gas being released at high velocity. Heretofore no satisfactory solution has been given the problem of adequately suppressing the regenerator noises. In accordance with the present invention, elimination of objectionable noises is effected in accordance with the principles discussed in the foregoing, i. e. by conversion of the normal low pitch sounds to short wave frequencies and then absorbing the latter by the use of a material selective in its sound absorbing properties in favor of the higher frequencies.

The various objects and details of the invention will be fully understood from the following description of an illustrative embodiment shown by the accompanying drawing, in which:

Fig. 2 is an enlarged fragmentary section of the stack structure;

Fig. 3 is a fragmentary section enlargement of the acoustical stack liner;

Fig. 4 is an enlarged cross-section on line 4—4 of Fig. 2; and

Fig. 5 is a fragmentary enlarged plan as viewed from line 5—5 of Fig. 2.

Figure 1:
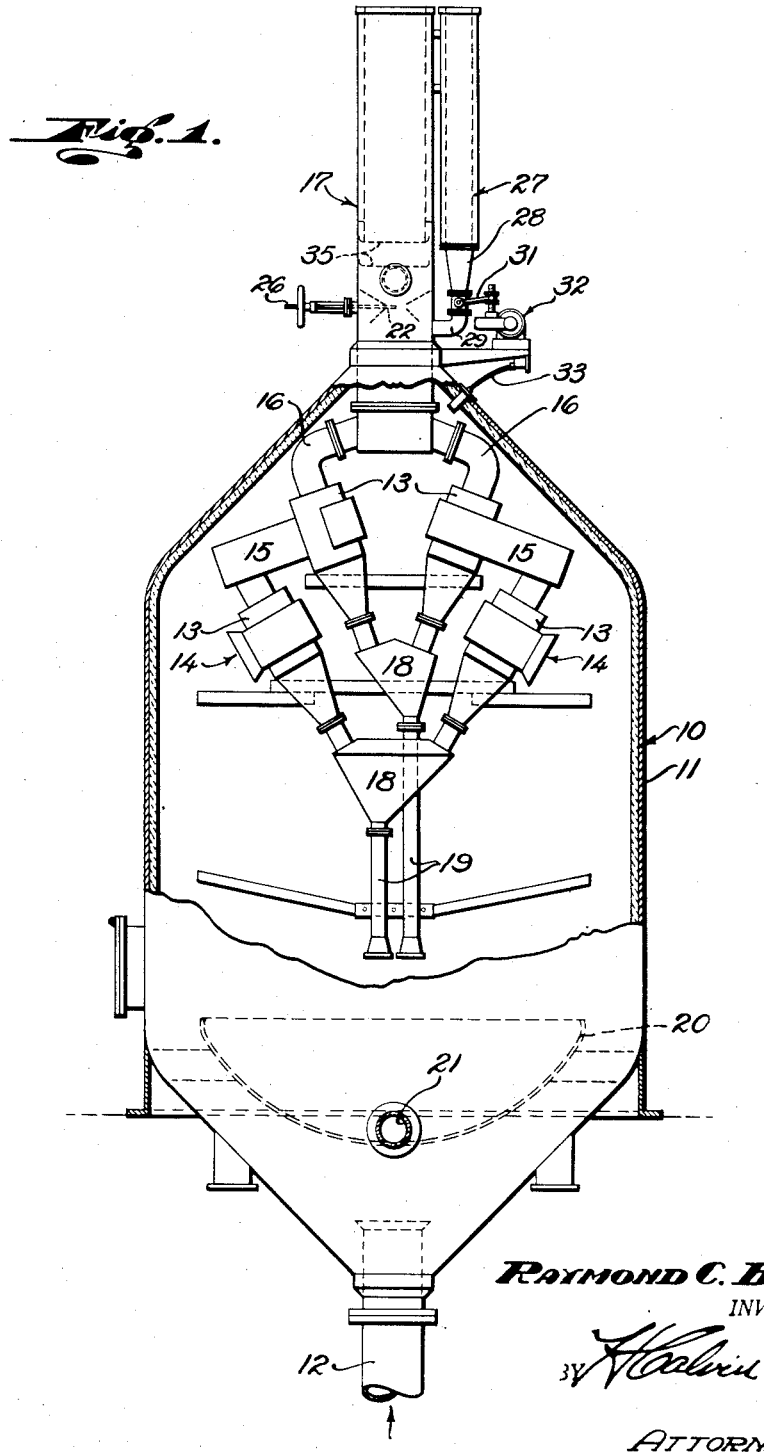
Fig. 1 is a general view, partly in section, illustrating the invention as applied to the suppression of noise developed by the gas discharge from a catalyst regenerator.

Referring first to Fig. 1, the invention is shown to have particular though typical utility for the suppression of noises generated by the high velocity gas discharge from a catalyst converter, having a separator assembly generally indicated at 10, of the general type used in conjunction with the so-called "fluid" type hydrocarbon cracking process. The assembly 10 may be described briefly as comprising a shell 11 receiving through inlet 12 a gaseous stream carrying entrained particles of solid catalyst. The shell contains an arrangement of separators 13 into which the gas flows through inlets 14 and ducts 15, and from which the gas, freed of the bulk of the entrained catalyst, is discharged through pipes 16 to the stack 17. The catalyst removed from the gas streams in the separators gravitates into the collectors 18 and falls through pipes 19 into the bottom receptacle 20 from which the catalyst is removed through pipe 21.

The invention is primarily concerned with the structures incorporated in the stack assembly for suppressing the noise normally created by the high velocity discharge of large gas quantities through the stack. Referring to Fig. 2, the main stack 17 through which the bulk of the gas normally is discharged, contains a slide valve 22 guided between plates 23 and 24 and serving to variably control the side of the gas passing opening 25 and therefore the restriction presented to the escape of gas from the regenerator. The valve 22 may be operated in any suitable manner, as by way of a connecting rod 26 accessible for outside manual or other control. The stack assembly may include a by-pass stack 27, the bottom portion of which converges at 28 to a pipe connection 29 with the stack 17 below the valve 22. The by-pass stack may contain a valve, such as the butterfly 30 rendered automatically responsive to the pressure in the regenerator shell, as by connecting the valve arm 31, see Fig. 1, with the conventionally illustrated pressure responsive motor control 32, which in turn is in effect connected to the interior of the regenerator shell by way of conduit 33. Assuming a given setting of the valve 22, the control 32 operates automatically in response to pressure changes in the regenerator, so control the by-pass valve 30 as to maintain substantially constant regenerator pressure.

Automatically the gas is permitted to escape through the valve controlled opening 25 into an open or unobstructed passage above. Due to the high velocity flow of gas past the valve into the stack chamber above, intense low pitch sounds are produced, probably because of the eddying and impact flow conditions at the low pressure side of the valve and as permitted by an open condition of the stack. As previously indicated, my primary object is to suppress the actual or potential noise creating tendencies of the gaseous discharge, and to accomplish this result by conversion of the low pitch sounds to relatively high pitch or short wave vibrations which are susceptible to acoustical dissipation or absorption.

Referring again to Fig. 2, the stack 17 contains above the valve 22 one or more plates 35 containing a uniform distribution of apertures 36 serving to divide the gas stream into a corresponding number of individual streams flowing at high velocity through the apertures. The size of the latter may be determined as desired, with particular regard to allowable pressure drop at the orifice place, to effect an acoustical conversion of the gas in the sense that in escaping through the plate apertures 36 the gas will have relatively high pitch sounds, i. e. its condition of flow will have been changed to relatively short or high frequency waves. The conversion of the low frequency turbulent energy of the gas to high frequency energy is a function of the size of the individual orifices in the plates. Generally speaking, the smaller the holes the higher will be the frequency of the resultant turbulent energy in the vicinity of the holes. Suitable means, generally indicated at 37 is provided within the upper interior of the stack for then suppressing the converted high pitch noises, such means being selectively effective in favor of the higher sound frequencies.

Absorption of the high pitch sounds may be effectively accomplished by providing within the stack an acoustical lining in the form of a tubular foraminate body characterized by its capacity for sound absorption by reason of its porosity or foraminate form. Typically the acoustical liner may consist of a length or series of sections 38 supported at the bottom on flange 39 and at intermediate locations by rings 40 carrying flanges 41 projecting outwardly between the sections and in more or less close proximity to the stack shell 17. At the top, the sections are retained in the stack by the flange ring 42 carrying brackets 43 fixed to the stack. As illustrated in Fig. 3, each section 38 may comprise an inner perforated shell 44 spaced from the stack shell to contain a foraminate mass such as a body 45 of fiber glass, the latter being retained between spaced screens 46.

As will be understood from the foregoing, the stack length above the apertured plates 35 will be sufficient to bring the gas into more or less extended contact with the acoustical lining, causing absorption or suppression of the high pitch sounds to a degree such that upon its discharge from the stack, the gas will transmit to the atmosphere no objectionable noises.

The by-pass stack 27 may be similarly equipped for suppression of noises created by the gas stream escaping past the butterfly valve 30. Here the stack 27 is shown to contain a plate 48 having a uniform distribution of small openings 49 similar to plates 35. Above plate 48, stack 27 contains sections 50 of the previously described acoustical lining serving effectively to suppress the increased pitch sounds created by the gas escape through the orifice plate 48.

I claim:

The combination comprising a vertically extending catalyst separator stack shell into which gas is discharged at high velocity and audible relatively low pitch sound frequencies, an internal wall in the lower portion of the shell, a valve cooperating with an opening in said wall to form a variable size relatively large restriction to the gas, means for setting the valve to controllably vary said restriction, a plurality of spaced plates extending transversely within the stack directly above said valve and containing a plurality of relatively small uniformly distributed orifices through which the gas flows axially of the shell at increased velocity and by which the gas flow is converted from low frequency sound energy to higher pitch sound energy, and vertically extended tubular sound absorbing material lining the stack shell above said plates and serving to absorb said high pitch energy.

RAYMOND C. BAIRD.

REFERENCES CITED

The following references are of record in the file of this patent:

UNITED STATES PATENTS

| Number | Name | Date |
|---|---|---|
| 328,840 | De Witt | Oct. 20, 1885 |
| 359,389 | Hill | Mar. 15, 1887 |
| 821,828 | Phelps | May 29, 1906 |
| 847,456 | Barnes | Mar. 19, 1907 |
| 1,173,447 | MacFarland | Feb. 29, 1916 |
| 1,810,252 | Noonan | June 16, 1931 |
| 1,857,845 | Hamilton | May 10, 1932 |
| 2,019,746 | Tatter | Nov. 5, 1935 |
| 2,157,115 | Cornell | May 9, 1939 |
| 2,378,542 | Edmister | June 19, 1945 |
| 2,378,607 | Watts | June 19, 1945 |

FOREIGN PATENTS

| Number | Country | Date |
|---|---|---|
| 4,843 | Great Britain | Mar. 31, 1887 |
| 102,901 | Australia | Jan. 20, 1938 |